(12) United States Patent
Wantland et al.

(10) Patent No.: US 12,741,885 B2
(45) Date of Patent: Sep. 22, 2026

(54) WATER FILTRATION ASSEMBLY AND FREEZE PREVENTION

(71) Applicant: Haier US Appliance Solutions, Inc., Wilmington, DE (US)

(72) Inventors: Louis A. Wantland, Louisville, KY (US); Bradley Nicholas Gilkey, Louisville, KY (US); Charles Benjamin Miller, Louisville, KY (US)

(73) Assignee: Haier US Appliance Solutions, Inc., Wilmington, DE (US)

(*) Notice: Subject to any disclaimer, the term of this patent is extended or adjusted under 35 U.S.C. 154(b) by 496 days.

(21) Appl. No.: 18/360,334

(22) Filed: Jul. 27, 2023

(65) Prior Publication Data

US 2025/0033997 A1 Jan. 30, 2025

(51) Int. Cl.
*C02F 1/00* (2023.01)

(52) U.S. Cl.
CPC .............. *C02F 1/003* (2013.01); *C02F 1/008* (2013.01); *C02F 2209/02* (2013.01); *C02F 2303/22* (2013.01); *C02F 2307/14* (2013.01)

(58) Field of Classification Search
None
See application file for complete search history.

(56) References Cited

U.S. PATENT DOCUMENTS

| | | | | |
|---|---|---|---|---|
| 8,100,141 | B2 | 1/2012 | Slupecki et al. | |
| 10,145,090 | B2 | 12/2018 | Fletcher | |
| 10,450,203 | B2 | 10/2019 | Schuster | |
| 2010/0132803 | A1 | 6/2010 | Fima | |
| 2013/0105324 | A1* | 5/2013 | Averbeck | C02F 1/4691 204/555 |
| 2020/0086248 | A1* | 3/2020 | McCollough | G06F 21/44 |

FOREIGN PATENT DOCUMENTS

| | | | | | |
|---|---|---|---|---|---|
| CN | 109419340 | A * | 3/2019 | | A47J 27/21166 |
| CN | 215715745 | U | 2/2022 | | |
| CN | 215756710 | U | 2/2022 | | |
| CN | 216837379 | U | 6/2022 | | |
| KR | 20200038624 | A | 4/2020 | | |
| WO | WO-2021188998 | A1 * | 9/2021 | | B01D 50/20 |

* cited by examiner

*Primary Examiner* — Richard C Gurtowski
(74) *Attorney, Agent, or Firm* — Dority & Manning, P.A.

(57) ABSTRACT

An under-counter water filtration assembly, including methods for performing the same, may include a filter housing, a filter element, and a powered water valve. The filter housing may define an inlet port, a filtered outlet port, and an unfiltered outlet port. The filtered outlet port and the unfiltered outlet port may be defined downstream from the inlet port. The filter element may be mounted within the filter housing upstream from the filtered outlet port. The filter element may be bypassed by the unfiltered outlet port. The powered water valve may be mounted within the filter housing in fluid communication between the inlet port and the unfiltered outlet port to selectively restrict a water flow therethrough.

18 Claims, 6 Drawing Sheets

100
110
114
152
142
164
166
150
154
146
136
134
132
130
162
120
124
122
112
138
164
128
V

WATER FILTRATION ASSEMBLY AND FREEZE PREVENTION

FIELD OF THE DISCLOSURE

The present subject matter relates generally to powered water filtration assemblies, such as reverse osmosis assemblies, as well as methods for operating the same.

BACKGROUND OF THE DISCLOSURE

Within modern residences and work space, it is common to have a water dispensing assembly water. Oftentimes, such assemblies include one or more filtration components for treating water (e.g., to remove harmful impurities, such as bacteria, viruses, microbes, metal particles, etc.) so that the water can be suitable for human consumption or some other personal, industrial, military, or medical use. For instance, an assembly may employ reverse osmosis (RO) filtration technology, which generally uses a semi-permeable membrane to separate water molecules from contaminants. Specifically pressure may be applied to a water flow to overcome osmotic pressure that favors even distributions.

In the case of a house or personal residence, it can be common to mount the water filtration assembly in an area that may be subject to freezing temperature (e.g., at or below 0° Celsius). In turn, the installed water filtration assembly may be susceptible to damage caused by frozen water. For instance, the accumulation of frozen water may restrict the flow of water through the water filtration assembly. In extreme cases the expansion to frozen water may cause one or more conduit or water-guiding portion of the filtration assembly to move, crack, or break, which in turn may cause water to leak out of the filtration assembly and to the surrounding area. Once a leak has started, it may be exceedingly difficult to halt the flow of water (or damage caused by the same).

As a result, it would be useful to have a water filtration assembly having one or more features to address the above issues. For instance, it may be advantageous to provide a water filtration assembly, or method of using the same, wherein water may reliably and robustly be prevented from freezing or otherwise causing damage in response to subfreezing temperatures.

BRIEF DESCRIPTION OF THE DISCLOSURE

Aspects and advantages of the invention will be set forth in part in the following description, or may be obvious from the description, or may be learned through practice of the invention.

In one exemplary aspect of the present disclosure, a method of operating an under-counter water filtration assembly is provided. The under-counter water filtration assembly may include a filter housing defining an inlet port, a filtered outlet port, and an unfiltered outlet port; a filter element mounted within the filter housing; and a normally open, powered, water valve (NOPV) mounted within the filter housing in fluid communication between the inlet port and the unfiltered outlet port. The method may include detecting a potential freeze event at the filter housing. The method may also include holding the NOPV in an open position to permit water therethrough. The method may further include directing water through the NOPV to a drain line downstream from the unfiltered outlet port.

In another exemplary aspect of the present disclosure, a method of operating an under-counter water filtration assembly is provided. The under-counter water filtration assembly may include a filter housing defining an inlet port, a filtered outlet port, and an unfiltered outlet port; a filter element mounted within the filter housing; and a powered, water valve (PV) mounted within the filter housing in fluid communication between the inlet port and the unfiltered outlet port. The method may include receiving a wireless weather-data signal at a controller mounted to the filter housing. The method may also include holding the PV in an open position to permit water therethrough. The method may further include directing water through the PV to a drain line downstream from the unfiltered outlet port.

In yet another exemplary aspect of the present disclosure, an under-counter water filtration assembly is provided. The under-counter water filtration assembly may include a filter housing, a filter element, and a powered water valve. The filter housing may define an inlet port, a filtered outlet port, and an unfiltered outlet port. The filtered outlet port and the unfiltered outlet port may be defined downstream from the inlet port. The filter element may be mounted within the filter housing upstream from the filtered outlet port. The filter element may be bypassed by the unfiltered outlet port. The powered water valve may be mounted within the filter housing in fluid communication between the inlet port and the unfiltered outlet port to selectively restrict a water flow therethrough.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
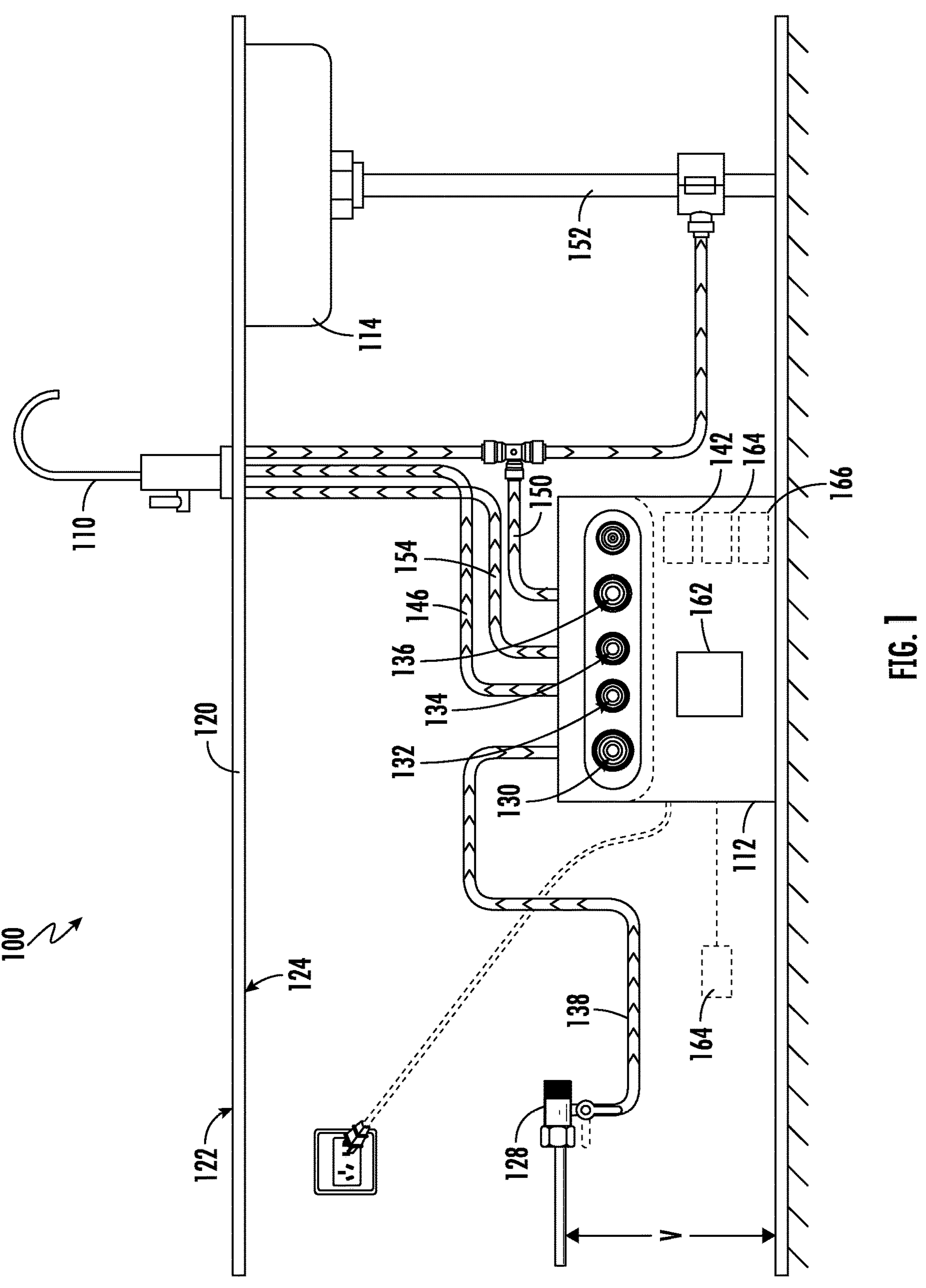
FIG. 1 provides a simplified elevation view of a water filtration assembly according to exemplary embodiments of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components or systems. For example, the approximating language may refer to being within a 10 percent margin (i.e., including values within ten percent greater or less than the stated value). In this regard, for example, when used in the context of an angle or direction, such terms include within ten degrees greater or less than the stated angle or direction (e.g., "generally vertical" includes forming an angle of up to ten degrees in any direction, such as, clockwise or counterclockwise, with the vertical direction V).

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

The terms "upstream" and "downstream" refer to the relative flow direction with respect to fluid flow in a fluid pathway. For example, "upstream" refers to the flow direction from which the fluid flows, and "downstream" refers to the flow direction to which the fluid flows.

Figure 2:
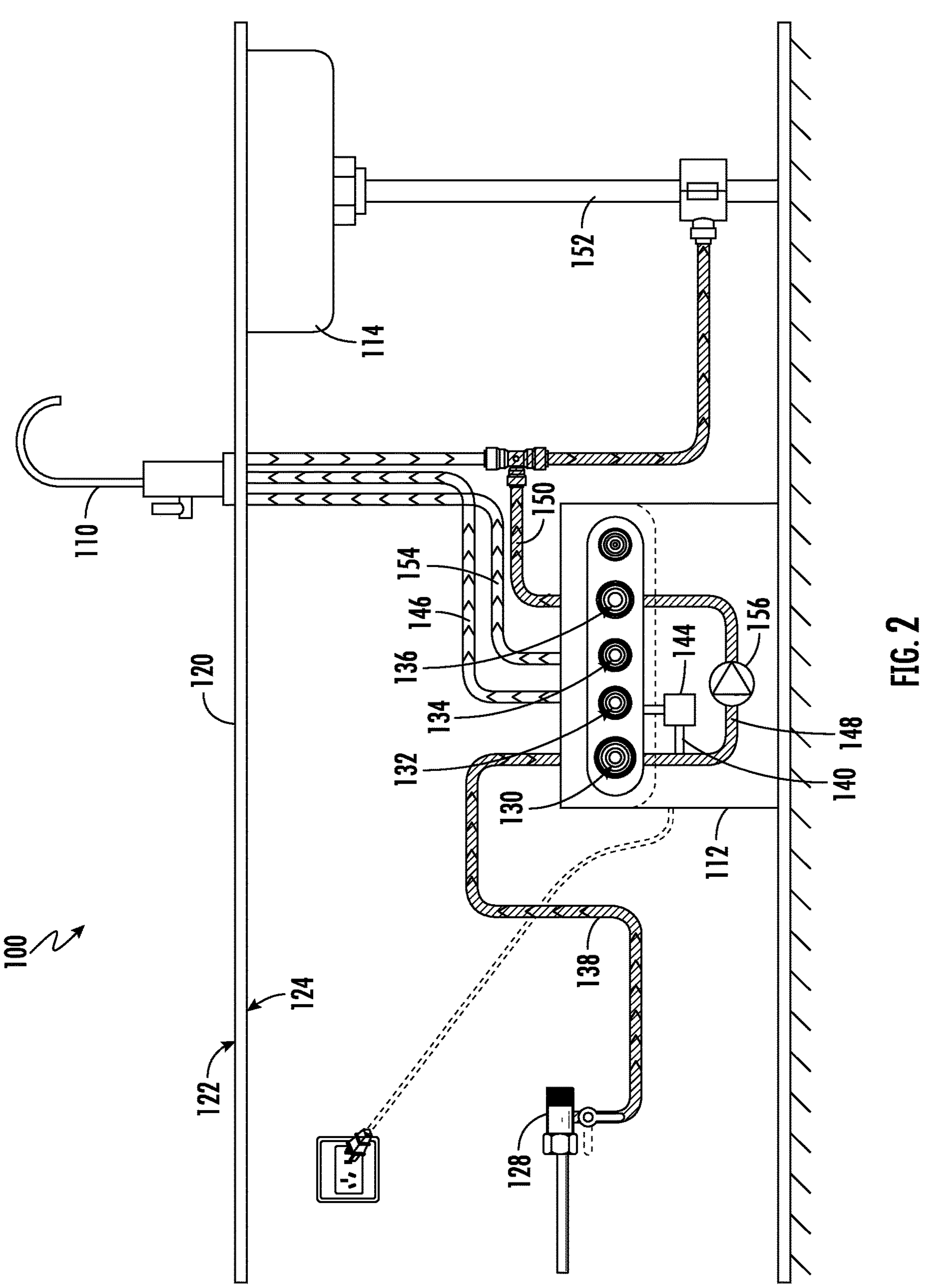
FIG. 2 provides another simplified elevation view of a water filtration assembly according to exemplary embodiments of the present disclosure during a potential freeze event.
Figure 3:
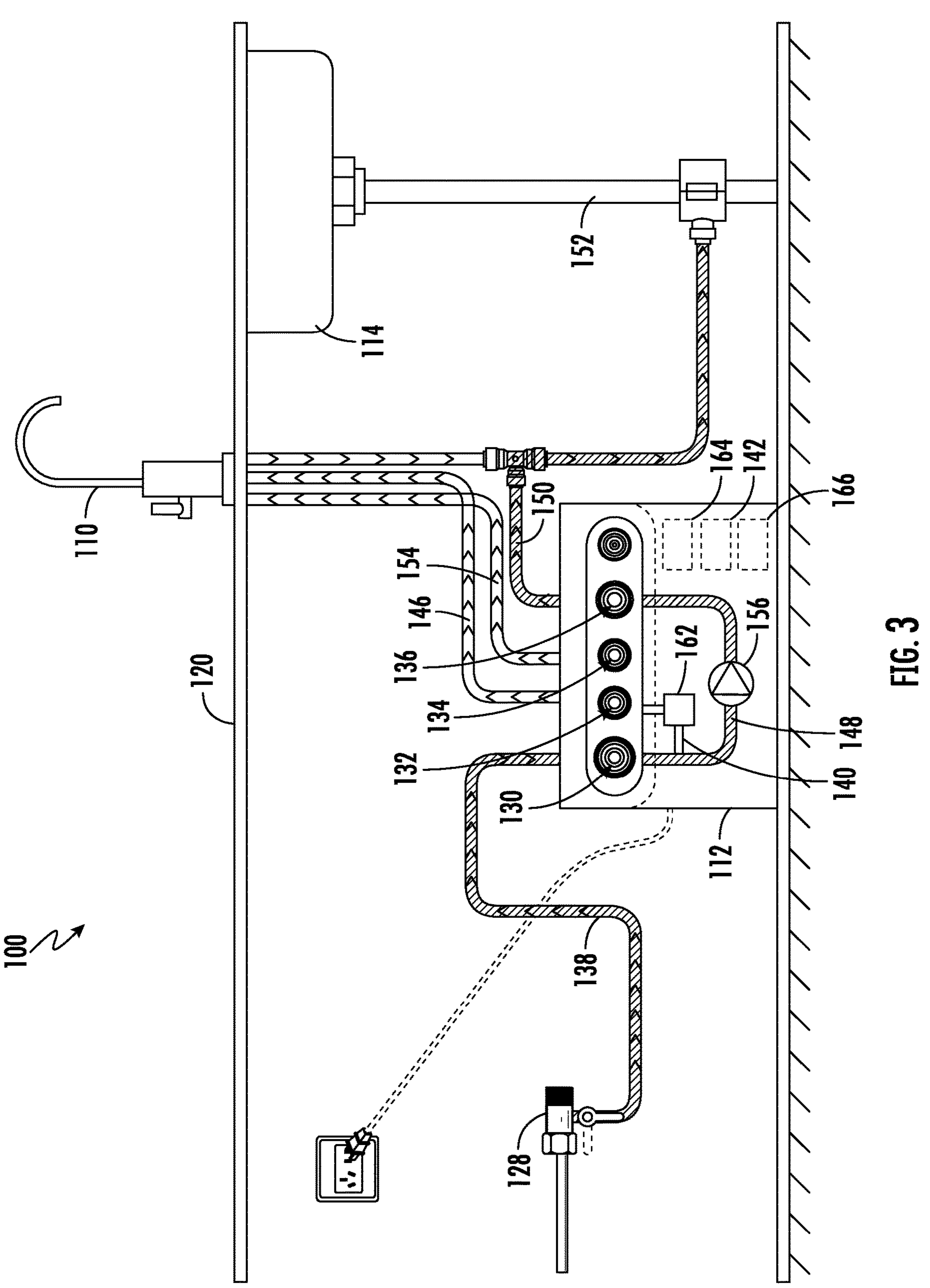
FIG. 3. provides another simplified elevation view of a water filtration assembly according to exemplary embodiments of the present disclosure during a potential freeze event.

Turning now to the figures, FIGS. 1 through 3 illustrate various exemplary embodiments of an under-counter water filtration assembly 100 of the present disclosure. Specifically, the figures provide simplified elevation views illustrating an upper dispenser 110 and a sink 114, such as a typical residential or commercial kitchen sink having a drain, to which upper dispenser 110 may be directed (e.g., for the dispensing of a water flow). As shown filtration assembly 100, may generally include a filter housing 112 that can be mounted in fluid communication and optionally below upper dispenser 110.

Generally, filtration assembly 100 defines a vertical direction V. In some embodiments, upper dispenser 110 is disposed above filter housing 112. At least a portion of sink 114 may be further disposed below upper dispenser 110, and an additional or alternative portion of sink 114 may be disposed above filter housing 112. In some embodiments, upper dispenser 110 is mounted to a counter 120 adjacent to sink 114. For instance, upper dispenser 110 may extend vertically upward away from a top surface 122 of counter 120. Filter housing 112 may be mounted or generally disposed below counter 120 while still being in (e.g., upstream) fluid communication with upper dispenser 110. Thus, one or more conduits may extend through counter 120 from bottom surface 124 to top surface 122. Nonetheless, it is understood that additional or alternative embodiments of filtration assembly 100 may fluidly connect filter housing 112 to upper dispenser 110 without passing through counter 120 (e.g., by routing a connecting conduit around counter 120 or through a proximate wall).

Generally, filter housing 112 defines multiple ports (e.g., openings, apertures, etc.) through which water may pass. In particular, filter housing 112 may define at least one inlet port 130, filtered outlet port 132, and unfiltered outlet port 134, 136. As will be described in greater detail below, both the filtered outlet port 132 and the unfiltered outlet port 134, 136 may be defined (e.g., along fluid parallel flow paths) downstream from inlet port 130. When installed, water (e.g., the initial volume of liquid water) can be selectively supplied to the filter housing 112 from a water source, such as a municipal water supply or well. In particular, a source conduit 138 may attach to filter housing 112 at inlet port 130 downstream from the water source. In some embodiments, a water supply valve 128 is disposed (e.g., outside of filter housing 112 or along source conduit 138) in upstream fluid communication with filter housing 112. In turn, water supply valve 128 may be opened and closed to control the flow of liquid water from the water source.

Within filter housing 112, multiple (e.g., fluid parallel) water paths may be defined downstream from inlet port 130. Specifically, an active-filtration path 140 may be defined to connect inlet port 130 to a filtered outlet port 132. Along the active-filtration path 140, one or more filter elements 144 may be mounted. Thus, within the filter housing 112 one or more filter elements 144 may be provided upstream from the filtered outlet port 132 to filter water thereto. In some embodiments, the filter element 144 includes a reverse osmosis (RO) filter membrane configured to separate water molecules from contaminants, as is understood. Nonetheless, additional or alternative embodiments can include other filter elements 144, such as a cartridge filter, may be provided upstream from filtered outlet port 132 (e.g., along active-filtration path). As shown, a filtered-fluid conduit 146 may attach to filter housing 112 at filtered outlet port 132 (e.g., upstream from the upper dispenser 110), such as to guide water therefrom to the upper dispenser 110. Separate from or in addition to active-filtration path 140, a non-filtration path 148 may be defined to connect inlet port 130 to one or more unfiltered outlet ports 134, 136. Thus, non-filtration path 148 is upstream from at least one unfiltered outlet port 134 or 136. Non-filtration path 148 may be free of filter or separating elements configured to remove particles from a flow of water through non-filtration path 148. In turn, the water flowing to or from unfiltered outlet ports 134, 136 may include the same particles provided in a raw water flow to inlet port 130 from the water source. Optionally, non-filtration path 148 may be in selective fluid communication with a portion of filter element 144. For instance, non-filtration path 148 may be connected to a concentrate outlet of filter element 144 or otherwise configured to receive concentrate or contaminants filtered out of the water flowing to filtered outlet port 132, as would be understood. When assembled, the non-filtration path 148 may generally bypass the active-filtration path 140. In turn, the filter element 144 may be bypassed by the unfiltered outlet ports 134, 136.

As shown, an unfiltered-fluid conduit 150 may attach to filter housing 112 at an unfiltered outlet port 134, 136 (e.g., unfiltered drainage outlet port 136). In particular, an unfiltered drainage outlet port 136 may be connected to an unfiltered-fluid conduit 150 upstream from a drain line 152 (e.g., extending downstream from sink 114), such as to guide water from unfiltered drainage outlet port 136 to the drain line.

In optional embodiments, multiple non-filtration paths or branches are provided within filter housing. For instance, it is understood that a second or additional non-filtration path (not pictured) may be provided in fluid communication between the inlet port 1300 and an unfiltered secondary outlet port 136. In other words, the additional non-filtration path may fluidly connect the inlet port 130 and the unfiltered secondary outlet port 136 (e.g., in fluid parallel to a primary non-filtration path 148). As shown, an unfiltered-fluid dispenser conduit 154 may attach to filter housing 112 at an unfiltered outlet port 134, 136 (e.g., unfiltered dispenser outlet port 134). In particular, an unfiltered dispenser outlet port 134 may be connected to an unfiltered-fluid dispenser conduit 154 upstream from a drain line 152 (e.g., extending downstream from sink 114), such as to guide water therefrom to the upper dispenser 110.

Although FIGS. 1 through 3 provide relatively simplified views of a filtration assembly 100, one of ordinary skill would understand that one or more active or electrically driven fluid elements may be provided within filter housing 112. For instance, one or more water pumps having a selectively activated pump motor may be provided within filter housing 112 downstream from inlet port 130 and upstream from one or more of the outlet ports 134, 136 to further pressurize, motivate, or drive a flow of water through filter housing 112 (e.g., across filter element 144, to upper dispenser 110, or to drain line 152).

In some embodiments, one or more water valves are provided within filter housing 112. In particular, at least one bypass water valve (e.g., PV 156) is mounted within filter housing 112 downstream from inlet port 130. Specifically, bypass water valve 156 may be in fluid communication between the inlet port 130 and the unfiltered outlet port 134, 136 to selectively restrict a water flow therethrough. As shown, PV 156 may further be upstream of at least one unfiltered outlet port 134, 136 (e.g., unfiltered drainage outlet port 136). For instance, PV 156 may be mounted along primary non-filtration path 148. Once assembled, PV 156 may be selectively opened-closed to permit-restrict water flow through non-filtration path 148. In other words, PV 156 may be opened (i.e., moved to an open position) to permit water from flowing through non-filtration path 148 and, alternately, closed (i.e., moved to a closed position) to restrict or prevent water from flowing through non-filtration path 148.

Figure 4:
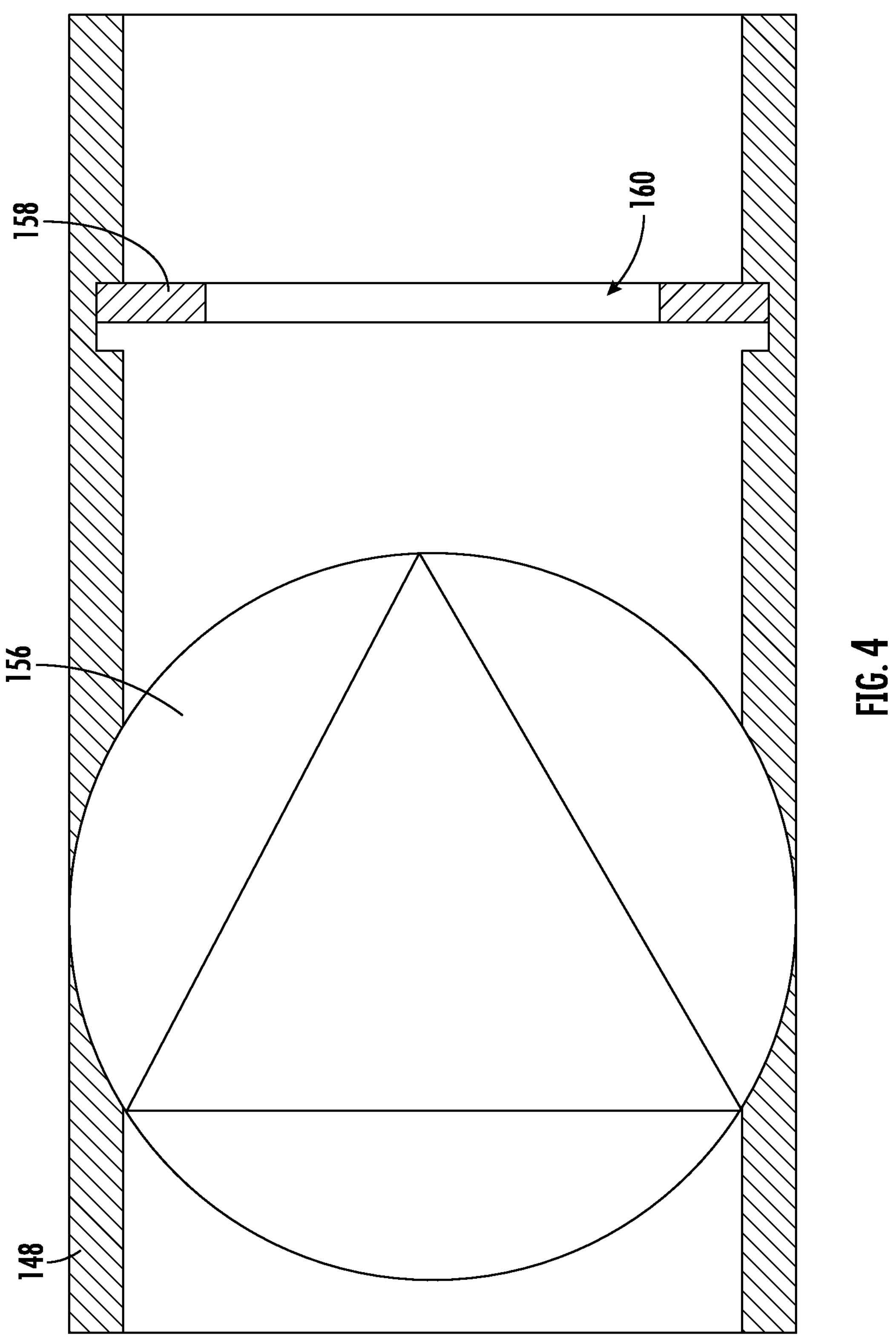
FIG. 4 provides a simplified cross-sectional view of a portion of a water filtration assembly according to exemplary embodiments of the present disclosure.

Turning briefly to FIG. 4, in some embodiments, a tuned whistle plate 158 is further provided within filter housing 112. In particular, tuned whistle plate 158 is provided along non-filtration path 148. Specifically, tuned whistle plate 158 may be downstream from PV 156. Moreover, tuned whistle plate 158 may be upstream from primary unfiltered outlet port 134, 136. Thus, tuned whistle plate 158 may be tuned whistle plate 158 mounted in fluid communication between the PV 156 and the unfiltered outlet port 134, 136. As shown, tuned whistle plate 158 may extend non-parallel to the direction of water flow through non-filtration path 148. In turn, tuned whistle plate 158 may, at least in part, disrupt the flow of water (i.e., while not completely preventing the same). A restricted aperture 160 may further be defined by tuned whistle plate 158. Generally, restricted aperture 160 may be configured to generate an audible noise in response to water (i.e., flowing water passing) across the tuned whistle plate 158 (e.g., through restricted aperture 160). For instance, the geometric dimensions of restricted aperture 160 may be tuned such cavitation of water or vibrations of tuned whistle plate 158 caused by the flow of water (e.g., at a predetermined flow rate or pressure range, such as below 0.4 MPa) to create sound waves that are audibly detectable to the average user (e.g., at or above 30 decibels from a distance of 30 centimeters or more). Thus, a mechanically generated auditory alert may be provided to indicate that water is flowing through primary non-filtration path 148.

Returning generally to FIGS. 1 through 3, in certain embodiments, PV 156 may include or be provided as a motorized valve (e.g., pneumatically, hydraulically, or electrically actuated valve); such as a motorized gate valve, ball valve, needle valve, solenoid, etc.; in operable communication with a power source (e.g., directly or indirectly). The motorized valve may be configured to selectively move the PV 156 between open and closed positions (e.g., as will be described below). For instance, PV 156 may include an electronic valve motor configured to open-close PV 156 in response to one or more received instruction signals (e.g., from controller 142), as would generally be understood.

In additional or alternative embodiments, PV 156 may include or be provided as a normally open, powered, water valve (NOPV) (i.e., normally open water valve). As is understood, the NOPV 156 is, at rest or when otherwise unpowered, generally set to the open position. The NOPV 156 may be configured to open (e.g., move to the open position) in response to a power loss. Only under power (e.g., when receiving a current from a power source), may the NOPV 156 able to move to the close position. Thus, the loss of power to the NOPV 156 in the assembled bypass valve may result in the opening of non-filtration path 148, thereby permitting water flow from inlet port 130 to unfiltered outlet port 136. This may be true even if one or more pumps within filter housing 112 or in fluid communication with non-filtration path 148 are unpowered or otherwise inactive.

Generally, the operation filtration assembly 100 may be controlled or regulated by a controller 142 (e.g., a single controller or multiple controllers) that is operative (e.g., electrical or wireless) communication with PV 156 or various other components. Controller 142 may include a memory (e.g., non-transitive media) and one or more microprocessors, CPUs or the like, such as general or special purpose microprocessors operable to execute programming instructions or micro-control code associated with operation of ice-making appliance 100. The memory may represent random access memory such as DRAM, or read only memory such as ROM or FLASH. In certain embodiments, the processor executes programming instructions stored in memory. The memory may be a separate component from the processor or may be included onboard within the processor. Alternatively, controller 142 may be constructed without using a microprocessor (e.g., using a combination of discrete analog or digital logic circuitry; such as switches, amplifiers, integrators, comparators, flip-flops, AND gates, and the like) to perform control functionality instead of relying upon software.

In optional embodiments, a user interface panel 162 is provided for controlling one or more functions of assembly 100. For example, user interface panel 162 may include a display (e.g., screen or illuminated icons) or a plurality of user inputs (not labeled), such as one or more buttons, switches, touch panels, etc. for selecting a desired function or mode of operation.

Operation of the filtration assembly 100 can be regulated by a controller 142 that is operatively coupled to user interface panel 162 or various other components, as will be described below. User interface panel provides selections for user manipulation of the operation of filtration assembly 100 such as e.g., selections between whole or crushed ice, chilled water, or other various options. In response to user manipulation of user interface panel 162 or one or more sensor signals, controller 142 may operate various components of the filtration assembly 100. Controller 142 may include a memory and one or more microprocessors, CPUs or the like, such as general or special purpose microprocessors operable to execute programming instructions or micro-control code associated with operation of filtration assembly 100. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 142 may be constructed without using a microprocessor, e.g., using a combination of discrete analog or digital logic circuitry (such as switches, amplifiers, integrators, comparators, flip-flops, AND gates, and the like) to perform control functionality instead of relying upon software.

Controller 142 may be positioned in a variety of locations throughout filtration assembly 100. In the illustrated embodiment, controller 142 is located within the user interface panel 162. In other embodiments, the controller 142 may be positioned at any suitable location within filtration assembly 100, such as for example on or within filter housing 112. Input/output ("I/O") signals may be routed between controller 142 and various operational components of filtration assembly 100. For example, user interface panel 162 may be in communication with controller 142 via one or more signal lines or shared communication busses.

As illustrated, controller 142 may be in communication with the various components of filtration assembly 100 and may control operation of the various components. For example, the various pumps, valves, switches, etc. may be actuatable based on commands from the controller 142. As discussed, interface panel 162 may additionally be in communication with the controller 142. Thus, the various operations may occur based on user input or automatically through controller 142 instruction.

In additional or alternative embodiments, filtration assembly 100 includes a network interface 166 that couples filtration assembly 100 (e.g., at controller 142) to a network such that filtration assembly 100 can transmit and receive information over the network, which can be any wired or wireless network such as a WAN, LAN, or HAN. In some such embodiments, one or more remote servers, such as a web server, are in operable communication with controller 142 through the network interface 166 (e.g., to provide data related to weather or power-impacting events (e.g., freeze events, tornado warnings, predicted hurricanes, or potential power outages). Thus, the controller 142 may receive one or more weather-data signals corresponding to detected or predicted environmental conditions at the location of the filtration assembly 100, as would be understood.

In further additional or alternative embodiments, one or more temperature sensors 164 may be provided on or in communication with filtration assembly 100. For instance, temperature sensor 164 may be provided in communication (e.g., wired or wireless communication) with controller 142 or bypass assembly. Optionally, a temperature sensor 164 may be mounted to or otherwise supported on filter housing 112. Additionally or alternatively, a temperature sensor 164 is mounted outside of the filter housing 112 and spaced apart from the filter housing 112 (e.g., below or above counter). Generally, temperature sensor 164 is provided as any suitable sensing element configured to detect ambient temperature (e.g., as a specific value or as binary condition relative to a predetermined low-temperature threshold, such as 0° Celsius) at the temperature sensor 164. For instance, the temperature sensor 164 may be provided as or include a thermistor, thermocouple, or bimetallic switch. Thus, the temperature sensor 164 may be configured to detect a freeze condition or event.

Figure 5:
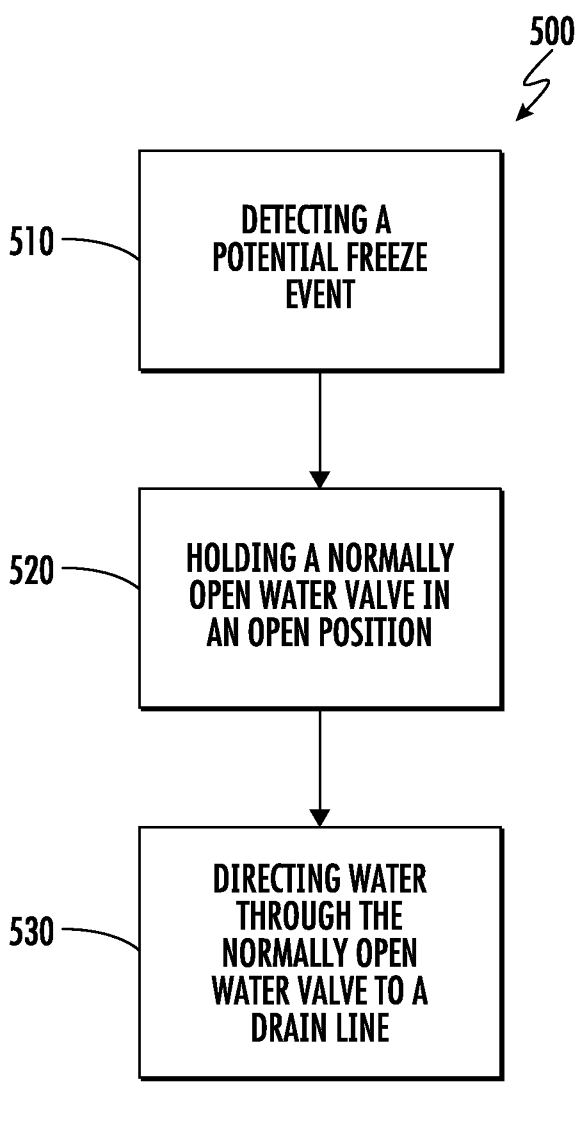
FIG. 5 provides a flow chart illustrating a method of operating a water filtration assembly according to exemplary embodiments of the present disclosure.
Figure 6:
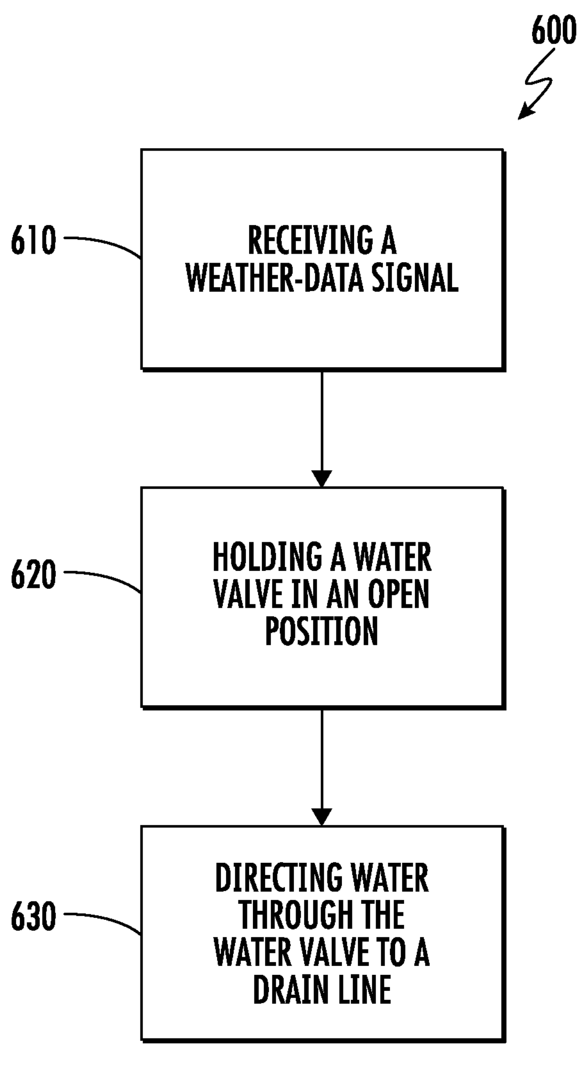
FIG. 6 provides a flow chart illustrating a method of operating a water filtration assembly according to exemplary embodiments of the present disclosure.

Turning now to FIGS. 5 and 6, the present disclosure may further be directed to methods (e.g., method 500 or 600) of operating a filtration assembly, such as water filtration assembly 100. In exemplary embodiments, the controller 142 may be operable to perform various steps of a method in accordance with the present disclosure.

The methods (e.g., 500 or 600) may occur as, or as part of, an assembly operation of water filtration assembly 100. In particular, the methods (e.g., 500 or 600) disclosed herein may advantageously prevent freezing or damage to filtration assembly (or a building plumbing network generally).

It is noted that the order of steps within methods 500 and 600 are for illustrative purposes. Moreover, none of the methods 500 and 600 are mutually exclusive. In other words, methods within the present disclosure may include one or more of methods 500 and 600. All may be adopted or characterized as being fulfilled in a common operation. Except as otherwise indicated, one or more steps in the below method 500 or 600 may be changed, rearranged, performed in a different order, or otherwise modified without deviating from the scope of the present disclosure.

Turning especially to FIG. 5, at 510, the method 500 includes detecting a potential freeze event. For instance, one or more active indicators or detectable variables may be detected as evidence to determine that the potential for freezing temperatures at or proximal to a filter housing is relatively high. In some embodiments, 510 includes detecting a temperature below a low-heat threshold (e.g., 0° Celsius) at a temperature sensor, as described above (e.g., in operable communication with a controller mounted to the filter housing or temperature sensor spaced apart and separate from the filter housing). Thus, detection of a relatively low temperature may indicate or prompt detection of a freeze event. In additional or alternative embodiments, 510 includes receiving one or more wireless weather-data signals at a controller mounted to the filter housing. Such weather-data signals may be received (e.g., wirelessly) from a remote server or weather service providing data regarding present or predicted environmental conditions, as would be understood. Moreover, receiving a weather-data signal including data (e.g., measured or predicted temperatures) indicating freezing conditions (e.g., ambient temperatures below 0° Celsius) may, in turn, prompt detection of a freeze event. Separate from or in addition to active indicators, one or more passive indicators may be detected at 510 to indicate the potential for freezing temperatures at or proximal to a filter housing is relatively high. For instance, a power loss event or trigger may occur. In particular, power supplied to the controller or NOPV from a power source (e.g., 110V or 220V wall outlet) may be halted, such as in the case of a blackout or localized power outage. In turn, the electrical current to the filtration assembly may be stopped and the power loss trigger may be experienced at the NOPV.

At 520, the method 500 includes holding a normally open water valve (e.g., NOPV) in an open position (e.g., in response to 510). Thus, the NOPV may be opened to permit water through the unfiltered water path. The opening of NOPV may be indefinite or for a predetermined amount of time (e.g., as directed by controller). Optionally, 520 may include selectively opening the NOPV according to a set schedule (e.g., rate). The set schedule may provide for alternately opening and closing the NOPV (e.g., as in a duty cycle). In turn, the opening of NOPV may be "pulsed" such that the open water valve is held in the open position intermittently, yet still in a predetermined rate or format. Alternatively, the NOPV may be held in the open position continuously (e.g., such that the opening through NOPV is not altered or closed for the duration of 520).

At 530, the method 500 includes directing water through the NOPV to a drain line. Specifically, water may be directed through the NOPV to a drain line downstream from the unfiltered outlet port. As described above, directing water through the NOPV may include bypassing the filter element mounted within the filter housing. In turn, water may be prevented from flowing through the filter element while maintaining a relatively unrestricted passage through the unfiltered water path.

Turning now to FIG. 6, at 610, the method 600 includes receiving a weather-data signal. For instance, one or more weather-data signals may be received at a controller mounted to the filter housing. Such weather-data signal may be received (e.g., wirelessly) from a remote server or weather service providing data regarding present or predicted environmental conditions, as would be understood. In some embodiments, receiving a weather-data signal including data (e.g., measured or predicted temperatures) indicating freezing conditions (e.g., ambient temperatures below 0° Celsius) may, in turn, prompt detection of a weather-related power event. In additional or alternative embodiments, receiving a weather-data signal including data (e.g., measured or predicted windspeeds or other conditions increasing the likelihood of a power outage) may, in turn prompt detection of a weather-related power event.

At 620, the method 600 includes holding a water valve (e.g., PV or bypass valve) in an open position (e.g., based on 610). For instance, the PV may be held in an open position in response to detecting a weather-related power event. At 620 the PV may be opened to permit water through the unfiltered water path. The opening of PV may be indefinite or for a predetermined amount of time (e.g., as directed by controller). Optionally, 620 may include selectively opening the PV according to a set schedule (e.g., rate). The set schedule may provide for alternately opening and closing the PV (e.g., as in a duty cycle). In turn, the opening of PV may be "pulsed" such that the open water valve is held in the open position intermittently, yet still in a predetermined rate or format. Alternatively, the NOPV may be held in the open position continuously (e.g., such that the opening through NOPV is not altered or closed for the duration of 620).

At 630, the method includes directing water through the water valve to a drain line. Specifically, water may be directed through the PV to a drain line downstream from the unfiltered outlet port. As described above, directing water through the PV may include bypassing the filter element mounted within the filter housing. In turn, water may be prevented from flowing through the filter element while maintaining a relatively unrestricted passage through the unfiltered water path.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of operating an under-counter water filtration assembly comprising a filter housing defining an inlet port, a filtered outlet port upstream from an upper dispenser, and an unfiltered outlet port connected to an unfiltered-fluid conduit upstream from a drain line, the drain line being downstream from the upper dispenser and a sink, the under-counter water filtration assembly further comprising a filter element mounted within the filter housing upstream from the filtered outlet port, and a normally open, powered, water valve (NOPV) mounted within the filter housing in fluid communication between the inlet port and the unfiltered outlet port, the method comprising:

detecting a potential freeze event at the filter housing;

holding the NOPV in an open position to permit water therethrough; and directing water through the NOPV to the drain line downstream from the unfiltered outlet port and the sink, wherein directing water through the NOPV comprises bypassing the filter element within the filter housing such that the upper dispenser and the sink are bypassed through the drain line.

2. The method of claim 1, wherein detecting the potential freeze event comprises experiencing a power loss trigger at the NOPV.

3. The method of claim 1, wherein detecting the potential freeze event comprises detecting a temperature below a low-heat threshold at a temperature sensor in operable communication with a controller mounted to the filter housing.

4. The method of claim 3, wherein the temperature sensor is mounted to the filter housing.

5. The method of claim 3, wherein the temperature sensor is mounted outside of the filter housing and spaced apart from the filter housing.

6. The method of claim 1, wherein detecting the potential freeze event comprises receiving a wireless weather-data signal at a controller mounted to the filter housing.

7. The method of claim 1, wherein holding the NOPV in the open position comprises selectively opening the NOPV according to a set schedule.

8. The method of claim 1, further comprising directing water through the NOPV comprises guiding water across a tuned whistle plate mounted within the filter housing in fluid communication between the NOPV and the unfiltered outlet port, the tuned whistle plate defining a restricted aperture configured to generate an audible noise in response to water across the tuned whistle plate.

9. A method of operating an under-counter water filtration assembly comprising a filter housing defining an inlet port, a filtered outlet port upstream from an upper dispenser, and an unfiltered outlet port connected to an unfiltered-fluid conduit upstream from a drain line, the drain line being downstream from the upper dispenser and a sink, the under-counter water filtration assembly further comprising a filter element mounted within the filter housing upstream from the filtered outlet port, and a powered, water valve (PV) mounted within the filter housing in fluid communication between the inlet port and the unfiltered outlet port, the method comprising:

receiving a wireless weather-data signal at a controller mounted to the filter housing;

holding the PV in an open position to permit water therethrough; and directing water through the PV to the drain line downstream from the unfiltered outlet port and the sink, wherein directing water through the PV comprises bypassing the filter element within the filter housing such that the upper dispenser and the sink are bypassed through the drain line.

10. The method of claim 9, wherein holding the PV in the open position comprises selectively opening the PV according to a set schedule.

11. The method of claim 9, wherein directing water through the PV comprises guiding water across a tuned whistle plate mounted within the filter housing in fluid communication between the PV and the unfiltered outlet port, the tuned whistle plate defining a restricted aperture configured to generate an audible noise in response to water across the tuned whistle plate.

12. An under-counter water filtration assembly comprising:

a filter housing defining an inlet port, a filtered outlet port upstream from an upper dispenser, and an unfiltered outlet port connected to an unfiltered-fluid conduit upstream from a drain line, the drain line being downstream from the upper dispenser and a sink, the filtered outlet port and the unfiltered outlet port being defined downstream from the inlet port;

a filter element mounted within the filter housing upstream from the filtered outlet port, the filter element being bypassed by the unfiltered outlet port; and a normally open, powered, water valve (NOPV) mounted within the filter housing in fluid communication between the inlet port and the unfiltered outlet port to selectively restrict a water flow therethrough such that the filter element is selectively bypassed within the filter housing and the upper dispenser and the sink are selectively bypassed through the drain line.

13. The under-counter water filtration assembly of claim 12, wherein the NOPV is configured to open in response to a power loss event.

14. The under-counter water filtration assembly of claim 12, further comprising:

a controller mounted to the filter housing in electrical communication with the NOPV to selectively move the NOPV between an open position and a closed position; and a temperature sensor in operable communication with the controller.

15. The under-counter water filtration assembly of claim 14, wherein the temperature sensor is mounted to the filter housing.

16. The under-counter water filtration assembly of claim 14, wherein the temperature sensor is mounted outside of the filter housing and spaced apart from the filter housing.

17. The under-counter water filtration assembly of claim 12, wherein the controller is configured to receive a wireless weather-data signal, and direct the NOPV to the open position in response to receiving the wireless weather-data signal.

18. The under-counter water filtration assembly of claim 12, further comprising a tuned whistle plate mounted within the filter housing in fluid communication between the NOPV and the unfiltered outlet port, the tuned whistle plate defining a restricted aperture configured to generate an audible noise in response to water across the tuned whistle plate.

* * * * *